(12) United States Patent
Nickel

(10) Patent No.: US 12,043,216 B1
(45) Date of Patent: Jul. 23, 2024

(54) VEHICLE WITH INTEGRATED PLATFORM

(71) Applicant: Golf Cart World LLC, Elkhart, IN (US)

(72) Inventor: Tom Nickel, Elkhart, IN (US)

(73) Assignee: Golf Cart World, LLC, Elkhart, IN (US)

( * ) Notice: Subject to any disclaimer, the term of this patent is extended or adjusted under 35 U.S.C. 154(b) by 0 days.

(21) Appl. No.: 18/433,740

(22) Filed: Feb. 6, 2024

Related U.S. Application Data

(60) Provisional application No. 63/590,579, filed on Oct. 16, 2023.

(51) Int. Cl.
*B60R 9/042* (2006.01)
*A61G 3/06* (2006.01)
*B60P 1/44* (2006.01)
*B60P 3/07* (2006.01)
*B60R 9/06* (2006.01)

(52) U.S. Cl.
CPC ............ *B60R 9/0426* (2013.01); *A61G 3/062* (2013.01); *B60P 1/4421* (2013.01); *B60P 3/07* (2013.01); *B60R 9/06* (2013.01); *B60Y 2200/23* (2013.01)

(58) Field of Classification Search
CPC . B60R 9/0426; B60R 9/06; B60R 2011/0085; B60Y 2200/23; B60Y 414/462; A61G 3/062; A61G 3/0209; B60P 1/4428; B60P 1/4421; B60P 3/122; B60P 3/07; B60P 414/462
USPC ........................................................ 414/462
See application file for complete search history.

(56) References Cited

U.S. PATENT DOCUMENTS

| | | | |
|---|---|---|---|
| 3,710,962 A | 1/1973 | Fowler, Jr. | |
| 4,071,152 A * | 1/1978 | Kinkead | A61G 3/0808 414/545 |
| 6,692,215 B1 | 2/2004 | Panzarella et al. | |
| 7,347,658 B2 | 3/2008 | Schlangen | |
| 7,686,562 B2 | 3/2010 | Panzarella et al. | |
| 7,784,587 B2 | 8/2010 | Zablocky | |
| 8,132,997 B2 | 3/2012 | Reuille et al. | |
| 9,918,885 B2 | 3/2018 | Soklaski | |
| 10,457,187 B1 | 10/2019 | Nash | |
| 11,007,919 B2 | 5/2021 | Nash | |
| 2003/0165376 A1 * | 9/2003 | Bruno | B60P 3/122 414/462 |
| 2005/0274759 A1 * | 12/2005 | Kircher | B60R 9/06 224/499 |
| 2008/0250984 A1 * | 10/2008 | Panzarella | B60P 3/07 108/44 |

(Continued)

*Primary Examiner* — Gregory W Adams
(74) *Attorney, Agent, or Firm* — Sanders Pianowski LLP

(57) ABSTRACT

A low speed vehicle is capable of transporting a mobility scooter on a platform that is attached to the vehicle and capable of pivoting between use and stowed positions. The platform can be secured in the stowed position. The platform can be raised and lowered with an actuator having a limit switch interlocked with the vehicle's propulsion system to prevent vehicle movement unless the platform is raised. The actuator is affixed to the vehicle's frame in at least two places, with an aft attachment adjacent the rear bumper and a fore attachment adjacent the rear axle. The platform also includes brake lights that illuminate orthogonally with at least one brake light facing rearward in the use or stowed position of the platform.

19 Claims, 12 Drawing Sheets

(56) References Cited

U.S. PATENT DOCUMENTS

2010/0290876 A1* 11/2010 Conatser ............... B60P 1/4421
                                                                              414/471
2013/0142602 A1    6/2013 Barnts
2015/0098778 A1* 4/2015 Derrick .................... B60R 9/06
                                                                              414/462

* cited by examiner

VEHICLE WITH INTEGRATED PLATFORM

CROSS REFERENCE TO RELATED APPLICATIONS

This application claims the benefit of Provisional Application Ser. No. 63/590,579, filed Oct. 16, 2023, the disclosure of which is incorporated by reference.

BACKGROUND OF THE INVENTION

The present disclosure relates to mobility devices, typically used by someone with a disability that may have difficulty walking or standing. Mobility scooters provide new freedom for these individuals, but these scooters have limited range and speed. These scooters are intended to be used indoors or on smooth ground. If the user wants to visit a store or other remote location, the scooter must typically travel with them. To do this, a lifting mechanism or platform is attached to a standard car, truck, or SUV, typically through a hitch receiver on the vehicle. When the location or terrain is not suitable for either the vehicle or the mobility scooter, it is a problem for someone with limited mobility. One example of this is a campground. At campgrounds and retirement communities, the mode of transportation is almost exclusively through golf carts. At campgrounds, the terrain is too uneven or unpredictable to use a mobility scooter, but the trails or pathways are not sized or intended for standard vehicle travel. Therefore, an improved device is needed to fill the gap between a vehicle and mobility scooter that can travel longer distances and traverse terrain.

SUMMARY OF THE INVENTION

The present disclosure describes a platform for a mobility scooter and its integration on compact "golf cart" style vehicles. For the purposes of this disclosure, the term golf cart includes Neighborhood Electric Vehicle (NEV), Low Speed Vehicle (LSV), and standard golf carts. While there are some differences between these vehicles, they all share a similar structure and overall size. A mechanism is permanently affixed to the vehicle frame with an integrated actuator that is capable of raising and lowering a platform. The platform can be in a stowed or use position and the mechanism can be in a raised or lowered position. In the stowed position, the platform is folded up in the vertical position. In the use position, the platform is folded down and horizontal. When the mechanism is in the raised position, the platform is lifted off of the ground. In the lowered position, the platform is adjacent the ground.

DESCRIPTION OF THE PREFERRED EMBODIMENT

Figure 1:
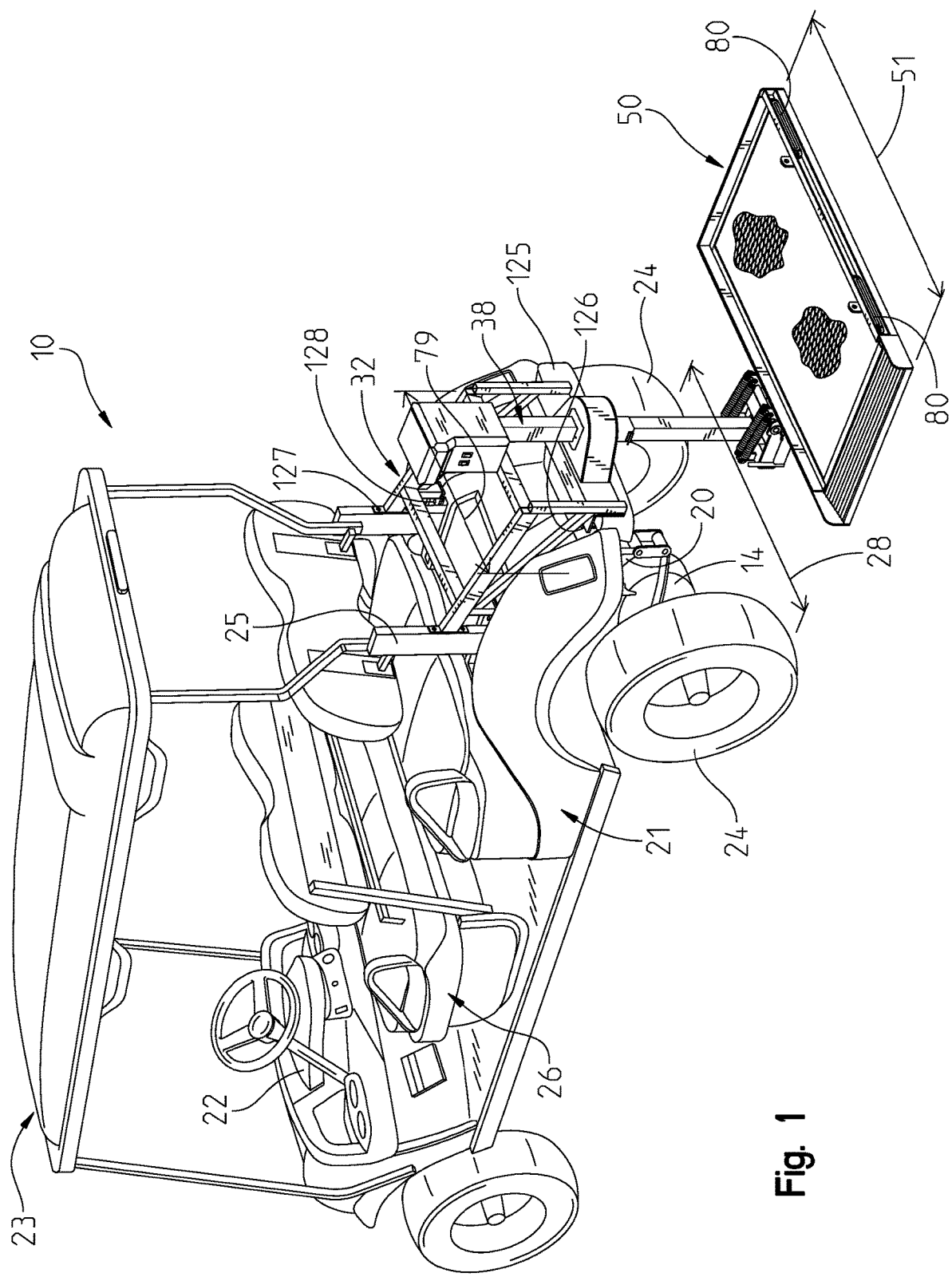
FIG. 1 is a rear isometric view of the vehicle with the platform in the lowered and use position.
Figure 2:
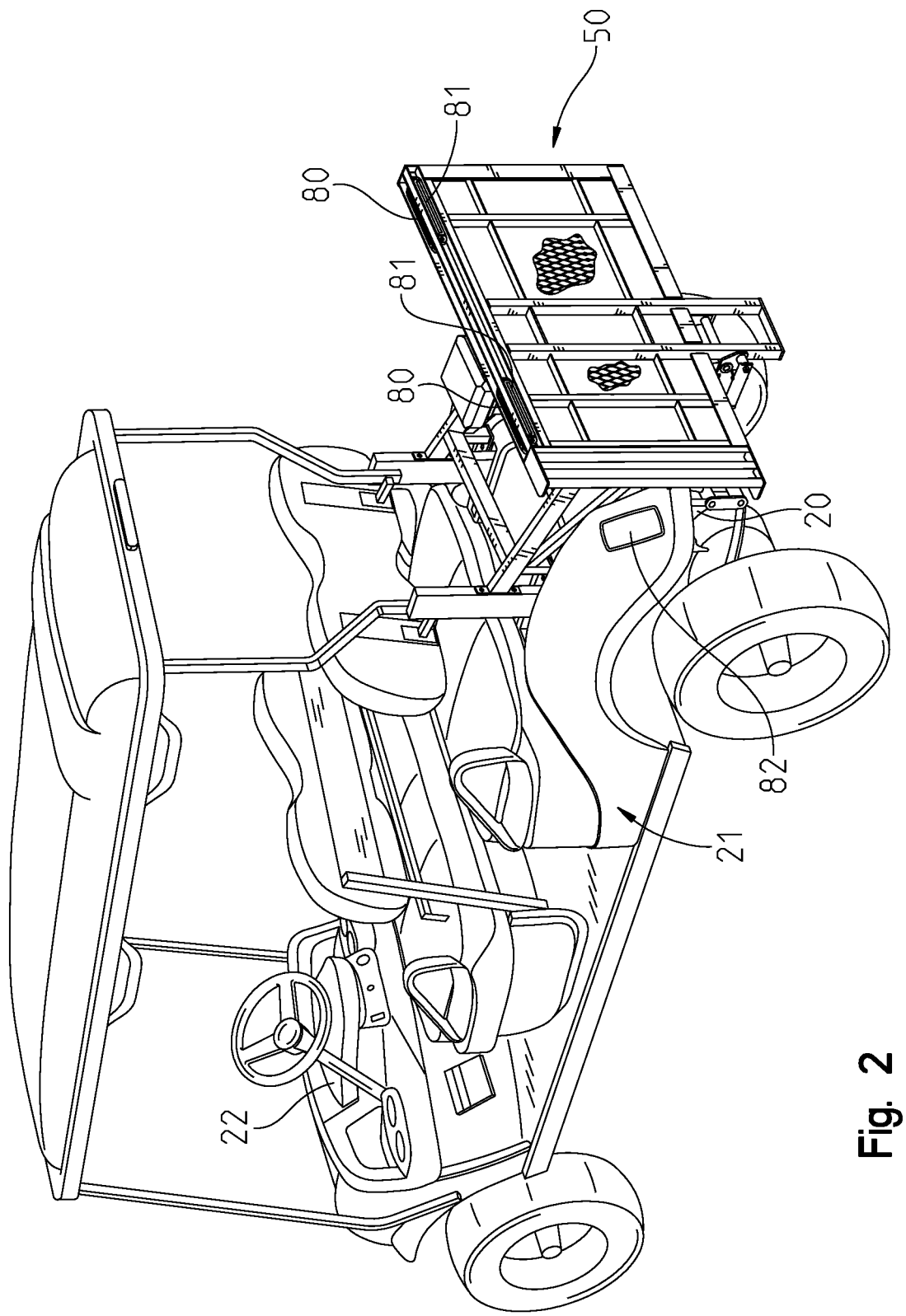
FIG. 2 is a rear isometric view of the vehicle in FIG. 1 with the platform in the raised and stowed position.
Figure 3:
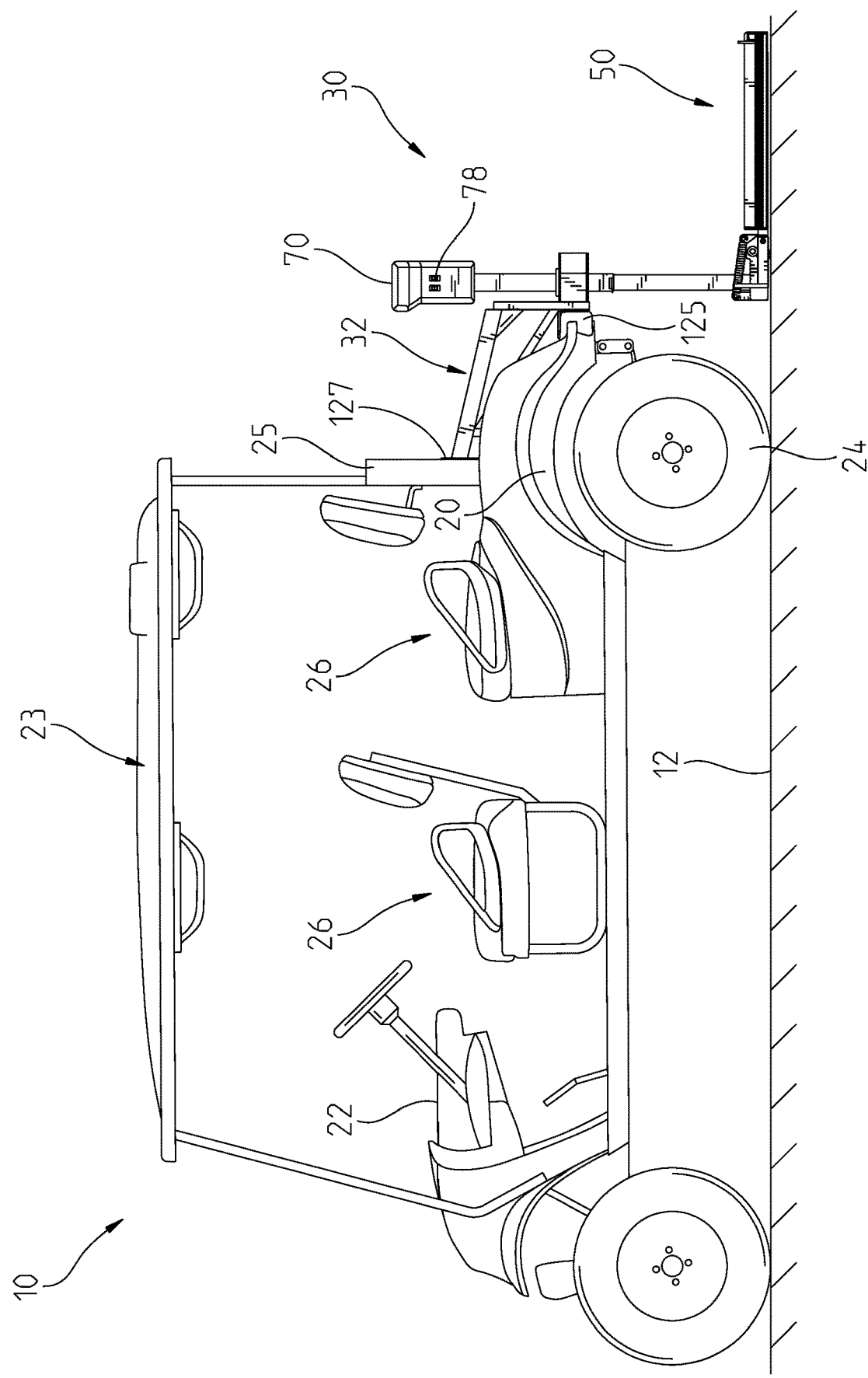
FIG. 3 is a left side view of the vehicle in FIG. 1.

A vehicle 10 with an integrated ramp is shown in FIGS. 1-4 and has a frame 20, body 21, driver controls 22, canopy 23, wheels 24, and seats 26. As shown, the vehicle 10 is electric, with a drive system 14 and battery pack. The battery pack is commonly an array of batteries and may be anywhere between 36 and 72 volts. The canopy 23 is attached through a canopy frame 25, as shown in FIG. 1. It is contemplated that the vehicle 10, instead of being powered by electricity, has an internal combustion engine that is powered by fuel. The vehicle 10 is a NEV, LSV, or golf cart with a narrow track (the spacing between wheels on a single axle) compared to a standard passenger car or truck. The vehicle 10 may have a roof or shade over the seating area but is otherwise open to the environment. For example, the vehicle 10 shown in the FIGS. has a track width 28 of approximately 4' (1.2 m).

Figure 5:
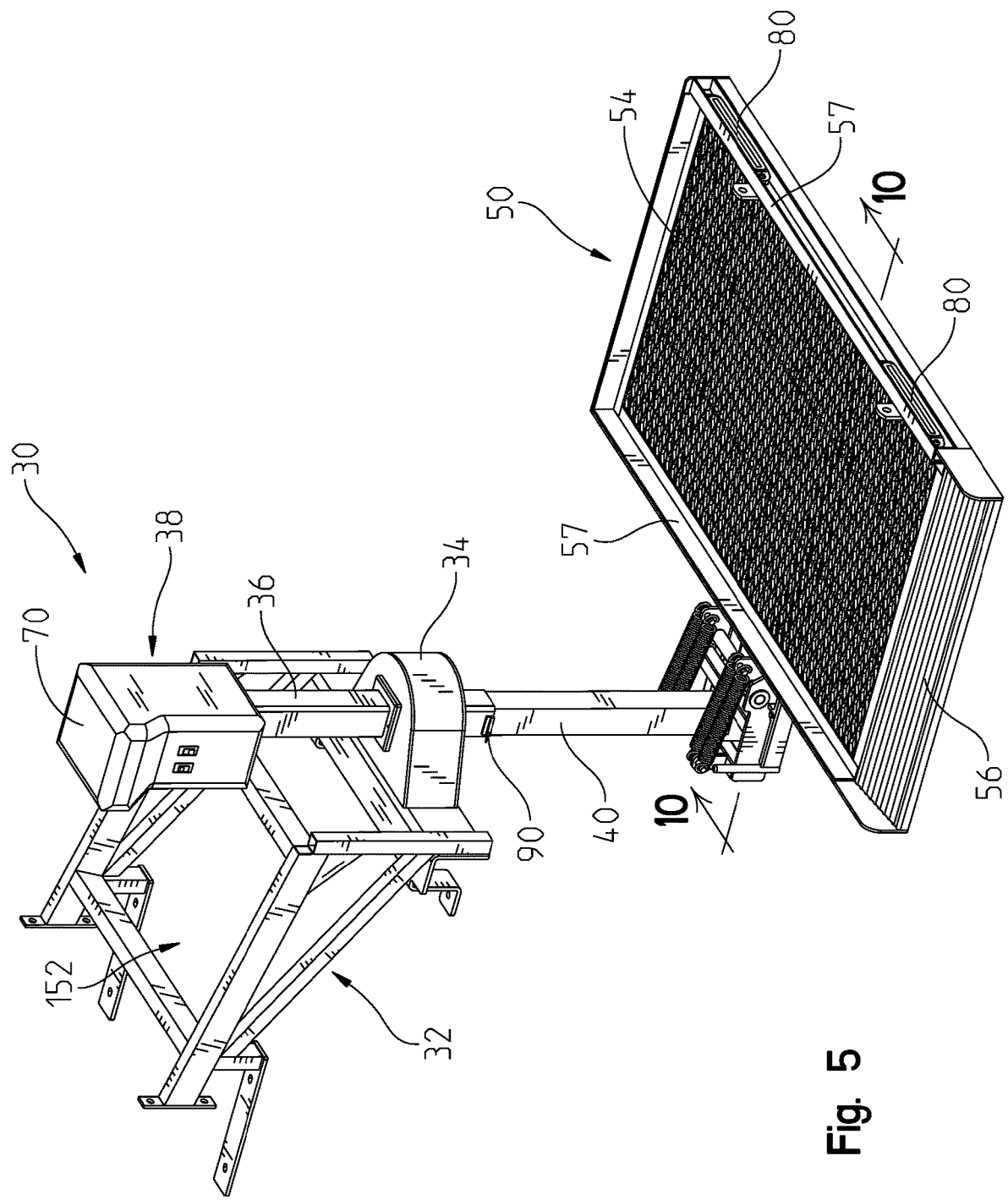
FIG. 5 is a rear isometric view of the platform mechanism in FIG. 1.
Figure 10:
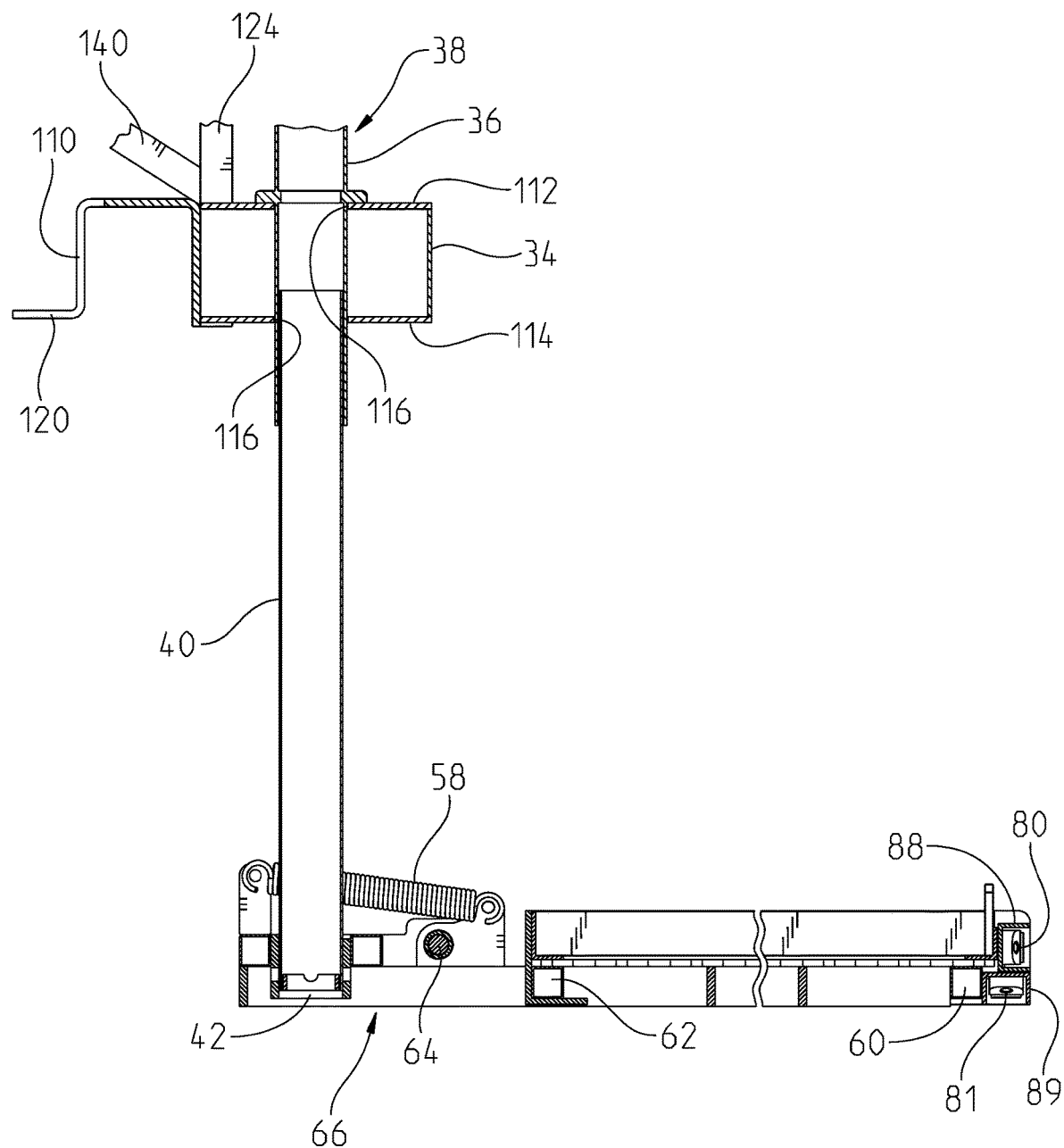
FIG. 10 is a partial left side section view 10-10 of the platform mechanism in the lowered and use position.
Figure 11:
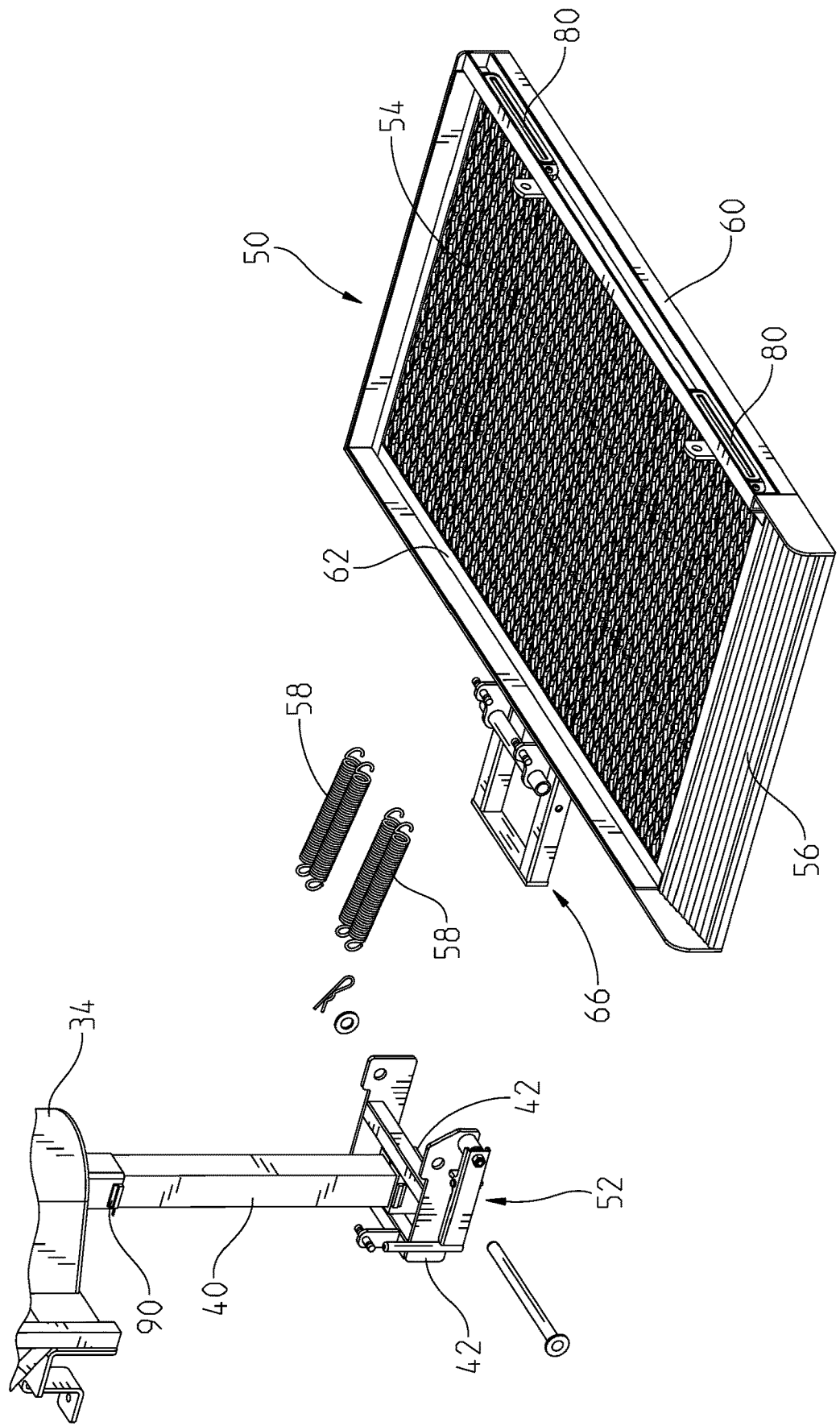
FIG. 11 is an exploded rear isometric view of the platform mechanism in FIG. 10.
Figure 12:
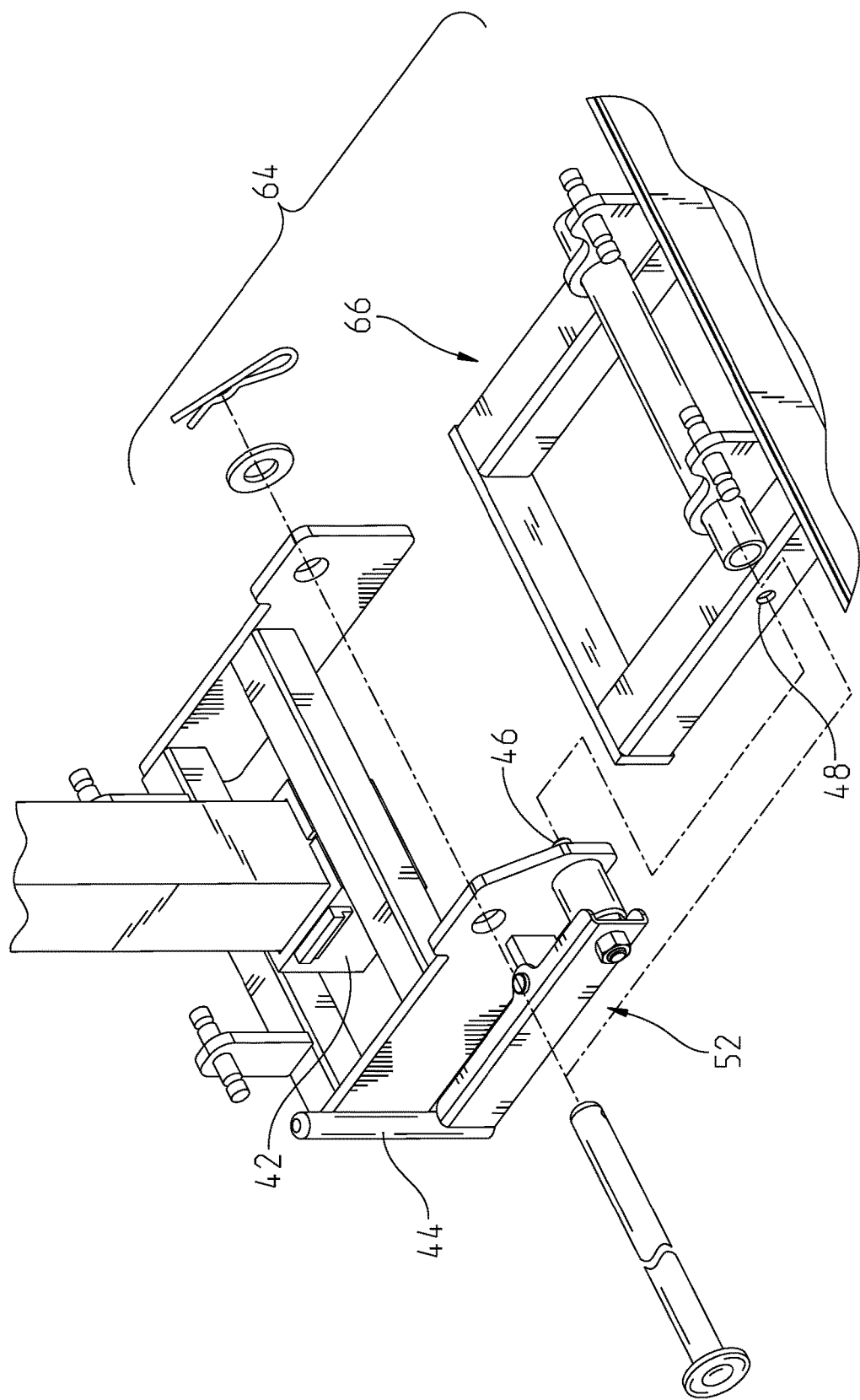
FIG. 12 is a partial exploded rear isometric view of the latch mechanism.

A platform mechanism 30, shown in FIG. 5 is affixed to the frame 20 of the vehicle 10 at the rear. The platform mechanism 30 has a frame attachment bracket or subframe assembly 32 that attaches directly to the vehicle frame 20 in at least two places. The frame 20 is the structural component of the vehicle 10, with the suspension, drive system 14, battery pack, and body 21 all being attached directly (or indirectly) thereto. An actuator mount 34 is attached to or integrated into the subframe 32, which provides a mounting point for a fixed portion 36 of the vertical actuator 38. The subframe 32 fixes the vertical actuator 38 with respect to the vehicle 10. The vertical actuator 38 is a linear actuator that can be a ball screw, acme screw, belt or cable drive, or other mechanism that has a moving portion 40 that telescopically moves with respect to the fixed portion 36 along an actuator axis 39. The actuator axis 39 is fixed with respect to the subframe 32 (and frame 20). The fixed and/or moving portions 36, 40 have an anti-rotation feature that prevents rotation between the fixed portion 36 and moving portion 40, making the only movement between them in the telescoping direction. As shown, the fixed and moving portions 36, 40 have a square or rectangular cross-sectional shape as the anti-rotation feature, but other shapes are contemplated. The vertical actuator 38 is moved using an electric motor 70 and may have limit switches that prevent overtravel of the mechanism and provide information to the user. Mechanical stops (not shown) to limit the travel of the actuator 38 are also contemplated. As shown, the electric motor 70 is wired to operate from standard automotive accessory voltages, such as 12 Volts DC, but other voltages are contemplated. The moving portion 40 moves between a raised position (shown in FIG. 8) and a lowered position (shown in FIG. 7) and has a terminal end 42 (shown in FIG. 10) that is close to or touching the ground 12 in the lowered position. In the raised position, the terminal end 42 is away from the ground 12.

The subframe 32 is made up of tubing and formed metal parts that are affixed together through welding and/or fasteners and attaches to the frame 20 through welding and/or fasteners. The subframe 32 has a lower mounting portion 110 that holds the actuator mount 34. The actuator mount 34 has an upper plate 112 and a parallel lower plate 114 that is spaced from the upper plate 112. The plates 112, 114 each have a central aperture 116 that are aligned to receive the actuator 38. The size and shape of the central aperture 116 is complementary to the fixed portion 36 and the spacing between the plates 112, 114 provides support for loads that are offset from the actuator axis 39. The lower mounting portion 110 is formed from sheet metal and has mounting flanges 120 with apertures 122 that allow fasteners to the frame 20. Affixed to the lower mounting portion 110 are vertical supports 124 that are affixed to an upper mounting portion 130. The upper mounting portion 130 has a rear transverse beam 132 and a forward transverse beam 134 that are attached to longitudinal beams 136, 138. Support gussets 140, 142 add rigidity to the subframe 32. The upper mounting portion 130 has mounting flanges 144 and 146, each having apertures 148, 150 that allow fasteners to affix the subframe 32 to the frame 20.

In the embodiment shown herein, the subframe 32 is affixed to the frame 20 in six places that are spaced from the centerline of the vehicle, at different places along the length of the vehicle 10, and also at different elevations. The subframe 32 overhangs the rear bumper 125, in particular the actuator mount portion 34. The lower mounting portion 110 is affixed to an aft mounting point 126 using apertures 122. The upper mounting portion 130 is affixed to a fore mounting point 128 using mounting flanges 146. The aft mounting point 126 is adjacent to or slightly forward of the rear bumper 125 and the fore mounting point 128 is located at a higher elevation over the rear axle. The mounting flanges 144 are affixed to the canopy frame 25 at canopy mounting points 127.

Figure 4:
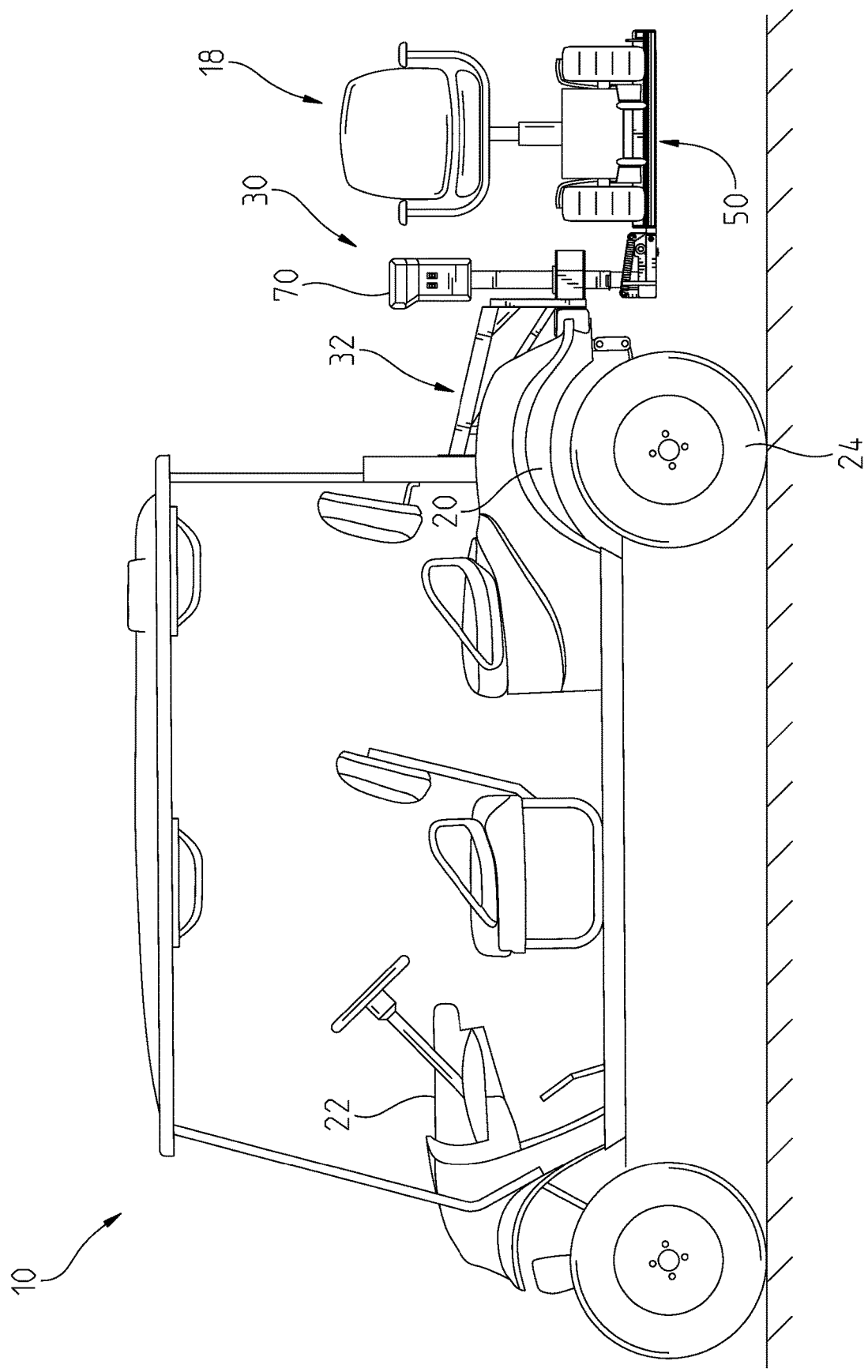
FIG. 4 is a left side view of the vehicle in FIG. 3 with the platform in the raised and use position carrying a mobility scooter.
Figure 6:
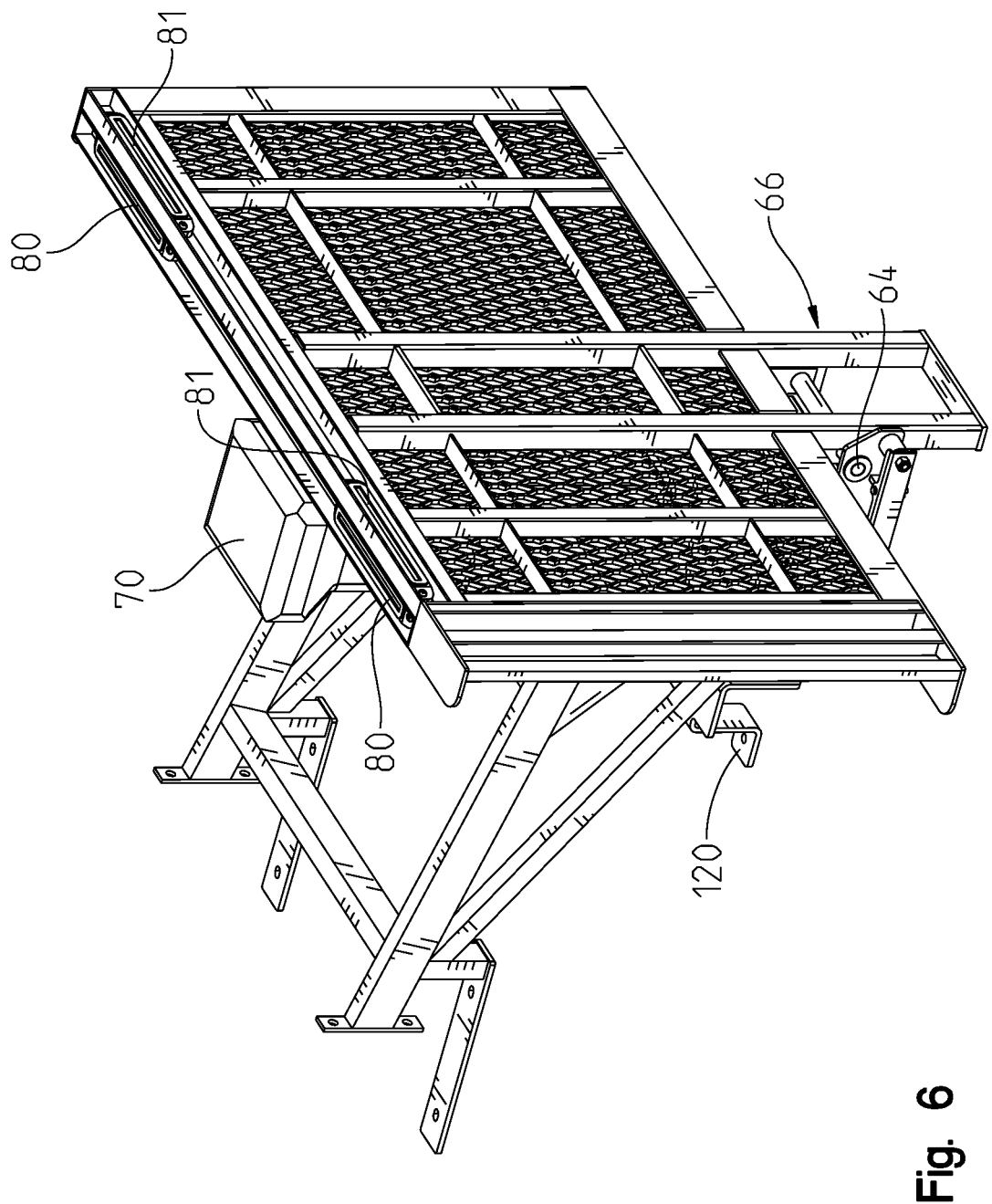
FIG. 6 is a rear isometric view of the platform mechanism in FIG. 2.
Figure 7:
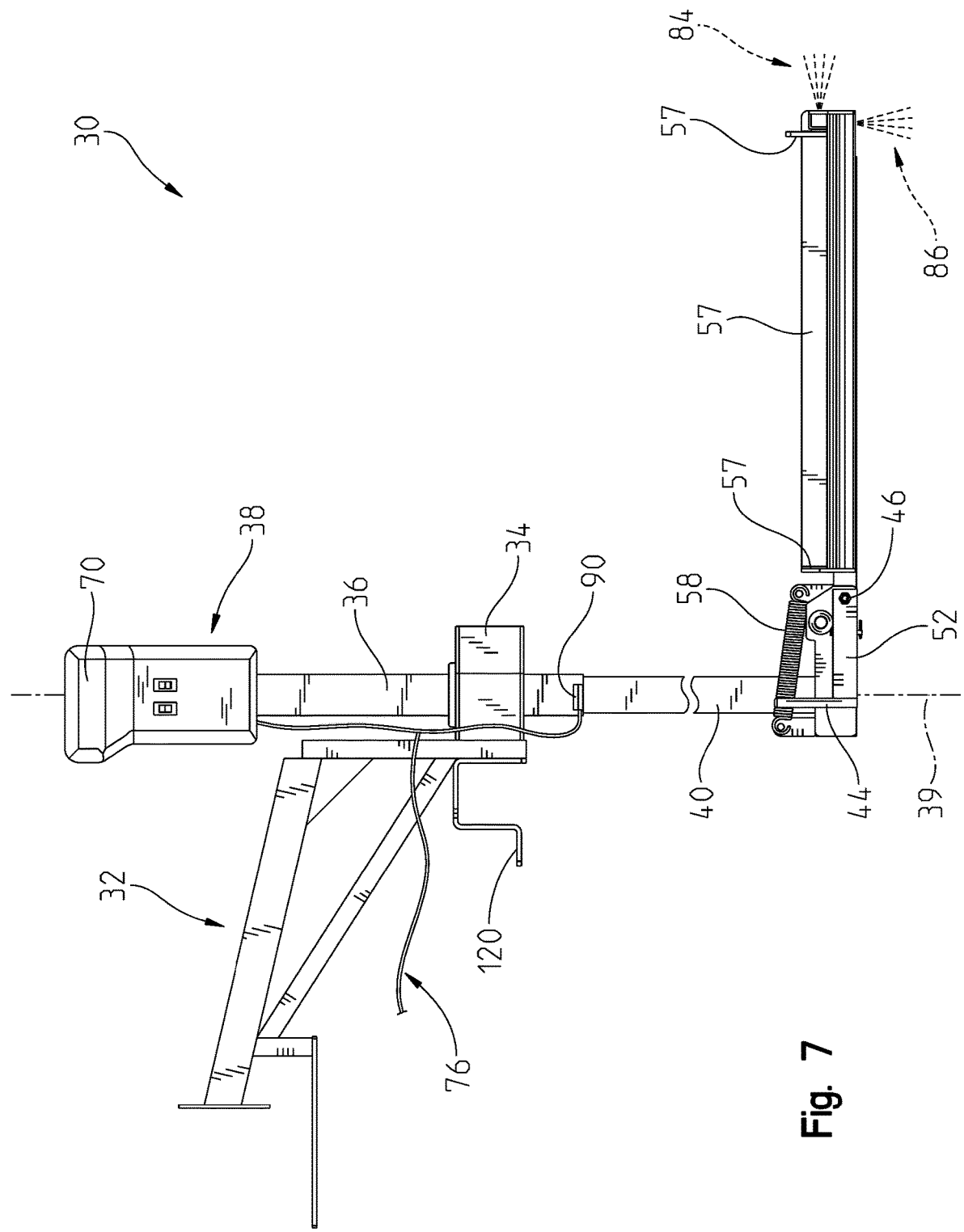
FIG. 7 is a left side view of the platform mechanism in FIG. 3.
Figure 8:
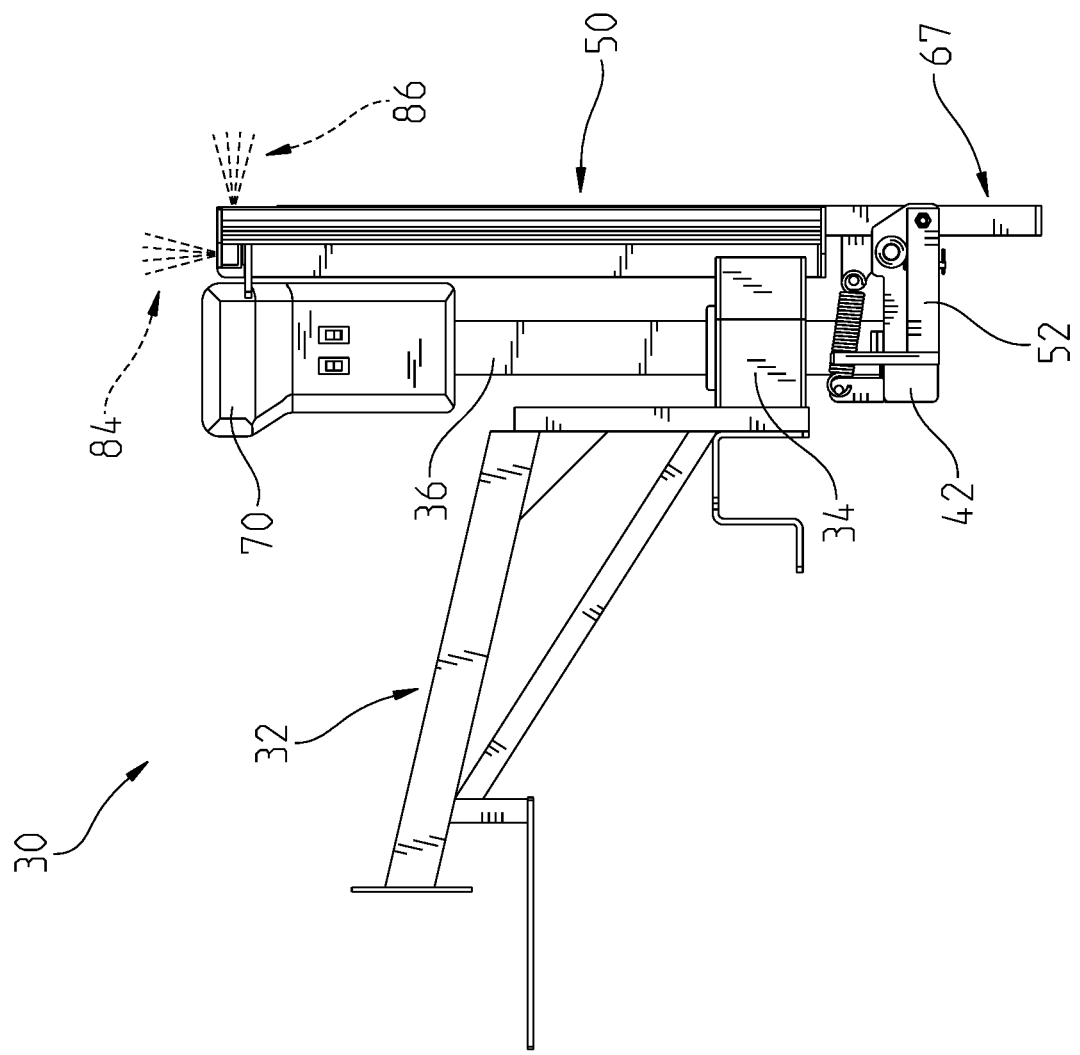
FIG. 8 is a left side view of the platform mechanism in FIG. 3 in the raised and stowed position.
Figure 9:
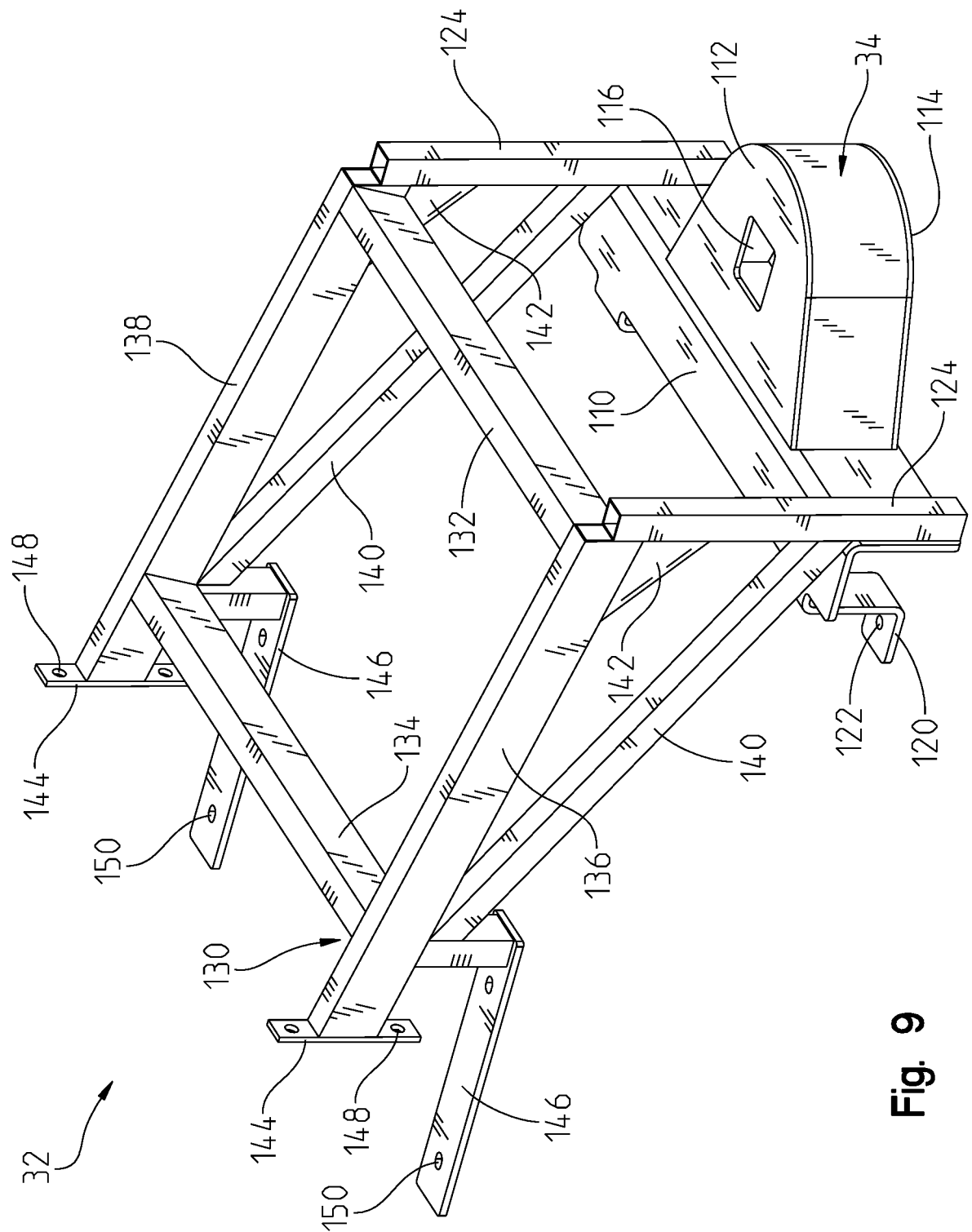
FIG. 9 is a rear isometric view of the subframe shown in FIG. 5.

A platform 50 is attached to the terminal end 42 and is pivotable between a stowed position (shown in FIGS. 6 and 8) and a use position (shown in FIGS. 5 and 7). The platform 50 has a width 51 that is nearly equal to or wider than the track width 28 of the vehicle 10. In any event, the width 51 is greater than the horizontal distance 79 between the existing signal lights 82. The existing signal lights 82 can be marker lights, tail lights, brake lights, or turn signals. In the use position, the platform 50 can hold and secure a mobility scooter 18 for storage or transportation. This is shown in FIG. 4. The platform 50 can be secured in the stowed position with a latch 52 and is counterbalanced with springs 58. In the stowed position, the platform 50 at least partially obscures the existing signal lights 82. For the purposes of this specification, obscurement of the signal lights 82 is defined by either the scooter 18 or platform 50 being located between the signal lights 82 and another driver following the vehicle 10. The platform 50 is shown as a rectangular structural component with a flat upper surface 54 and at least one ramp portion 56. The platform 50 includes a perimeter wall 57 that extends above the upper surface 54. The ramp portion 56 is an angled surface that extends to the upper surface 54. A distal lateral edge 60 is parallel to and opposite a proximal lateral edge 62. A hinge 64 is affixed near the proximal lateral edge 62 and terminal end 42 of the moving portion 40 to allow the platform 50 to pivot between the stowed and use positions. The platform 50 has a spine 66 that extends from the distal lateral edge 60 and terminates beyond the proximal lateral edge 62 to support the upper surface 54. A portion 67 of the spine 66 extends beyond the proximal lateral edge 62 that protrudes below the terminal end 42 when the platform 50 is pivoted to the stowed position. The portion 67 contacts the ground if the platform 50 is in the stowed position and the actuator is lowered. The latch 52 is adjacent to the hinge 64 and is biased towards a locked position. The latch 52 is moveable to an unlocked position through operation of a release handle 44. In the unlocked position, a lock pin 46 is retracted and the platform 50 can freely pivot between the stowed and use positions. In the locked position, the lock pin 46 protrudes and engages with a locking feature 48 on the platform 50 in the stowed position to secure it. The latch 52 is not tied to the position of the moving portion 40 of the actuator 38.

Orthogonal brake lights 80, 81 are attached to the distal lateral edge 60 of the platform 50, either as a single unit or separately mounted in an orthogonal orientation. Because the vehicle 10 is more narrow than a standard automobile, the indicator lights such as brake and turn are spaced apart from each other by the distance 79 that is smaller than the width 51 of the platform 50. Therefore, the scooter 18 or platform 50 in the stowed position obscures the existing signal lights 82. The orthogonal brake lights 80 are wired to work with the existing signal lights 82 on the vehicle 10 and have luminaires that simultaneously illuminate in two directions 84, 86 that are perpendicular to each other. The two directions 84, 86 may not be exactly perpendicular, based on the angle of the platform between the stowed and use positions. It is contemplated that the platform 50, hinge 64, or other component has a sensor or switch that enables only one direction 84, 86 of the brake lights 80, depending on the pivoted position of the platform 50. One of these directions 84 is parallel to the platform 50 and the other direction 86 is perpendicular. When the platform 50 is in the use position, the first direction 84 faces and/or is visible to traffic directly behind the vehicle 10. When the platform 50 is in the stowed position, the second direction 86 faces and/or is visible to traffic directly behind the vehicle 10. C-shaped protective channels 88, 89 are affixed adjacent to the distal lateral edge 60 and protect the orthogonal brake lights 80, 81 from damage.

The limit switches can be used to provide information to the driver on the driver controls 22. When the moving portion 40 is raised, the upper limit switch 90 is closed, illuminating a light on the controls 22. This alerts the driver that it is safe to drive the vehicle 10. If the moving portion 40 is not fully raised, the upper limit switch 90 is not closed so the corresponding light is not illuminated. In addition to the indicator lights on the driver controls 22, the limit switches 90 can also be used as a safety interlock to prevent the vehicle 10 from being moved unless the upper limit switch 90 is closed. One example would be if the user did not raise the actuator 38 and then attempted to move the vehicle 10. With the limit switch 90 in electrical communication with the driver controls 22, drive system 14, and/or battery pack, the vehicle 10 can be disabled from movement unless the actuator 38 is sufficiently raised. The driver controls 22 provide an indication to the user, such as a warning lamp, buzzer, or display that vehicle 10 cannot move unless the actuator 38 is raised.

Power for the platform mechanism 30 is from the vehicle 10. Due to the differences between the battery voltage of the vehicle 10 (36-72 VDC) and typical allowable voltage range of the mechanism (~12-16 VDC), a voltage converter (not shown) may be implemented. Power and communication to the mechanism 30 is accomplished through a wiring harness 76. The wiring harness 76 provides power for lift controls 78, the status of the limit switches 90, connections for vehicle interlocking, along with power and signals for the orthogonal brake lights 80. The lift controls 78 move the vertical actuator 38 between the raised and lowered positions. It is contemplated that the lift controls 78 are located with the driver controls 22.

The transverse beams 132, 134 and longitudinal beams 136, 138 form an opening 152 to receive a rear storage compartment. The rear storage compartment may have a lid that allows the user to secure valuables or other items. The storage compartment may be lockable, removable, and contain interior illumination when opened. In addition, the motor 70 may have a light that shines into the rear storage compartment.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A compact vehicle for use with a mobility scooter:
    said compact vehicle having a frame, a body, and a propulsion system connected to a battery;
    a subframe affixed to said frame, said subframe having an actuator mount portion extending beyond a rear bumper on said compact vehicle;
    a vertical actuator having a fixed portion and a moving portion, said fixed portion is affixed to said actuator mount portion, said moving portion telescopically movable between a raised and a lowered position;
    a limit switch in electrical communication with said propulsion system;
    a platform pivotably affixed to a terminal end of said moving portion, said platform pivotable between a stowed and a use position;
    said platform is securable in said stowed position by a latch, said latch having a release handle coupled to a lock pin and is biased towards a locked position, said locked position defined by said lock pin extending outwardly, when said platform is in said stowed position, said lock pin mates with a locking feature in said locked position, said release handle for moving said lock pin to an unlocked position defined by said locking feature free of said lock pin; and
    when said moving portion is away from said raised position, said limit switch disables said propulsion system.

2. The compact vehicle of claim 1, wherein said vehicle having signal lights affixed to said body and spaced horizontally from each other by a first distance, said platform having a width greater than said first distance, when said platform is in said stowed position, said signal lights are obscured.

3. The compact vehicle of claim 1, further comprising orthogonal brake lights affixed to a distal lateral edge of said platform, said orthogonal brake lights facing a first direction and a second direction perpendicular to said first direction.

4. The compact vehicle of claim 1, wherein said vehicle having a track width defining a second distance, said platform having a width greater than said second distance.

5. The compact vehicle of claim 1, further comprising an indicator in electrical communication with said limit switch, said indicator providing a status of said limit switch and said propulsion system.

6. The compact vehicle of claim 1, wherein said subframe has a lower mounting portion and an upper mounting portion, said lower mounting portion is affixed to said frame adjacent said rear bumper on said vehicle, said upper mounting portion is affixed to said frame over a rear axle.

7. The compact vehicle of claim 6, wherein said actuator mount portion has an upper plate and a lower plate spaced from and parallel to said upper plate, said upper and lower plates each having a central aperture to receive said fixed portion of said vertical actuator, said lower mounting portion is affixed to said frame at an aft mounting point forward of said rear bumper, said rear bumper located between said actuator mount portion and said aft mounting point.

8. A compact vehicle for use with a mobility scooter:
    said compact vehicle having a frame, a body, and a propulsion system connected to a battery;
    a subframe affixed to said frame, said subframe having an actuator mount portion extending beyond a rear bumper on said compact vehicle, said actuator mount portion has an upper plate and a lower plate spaced from and parallel to said upper plate, said upper and lower plates each having a central aperture to receive said fixed portion of said vertical actuator, said subframe has a lower mounting portion and an upper mounting portion, said lower mounting portion is affixed to said frame adjacent said rear bumper on said vehicle, said upper mounting portion is affixed to said frame over a rear axle, said lower mounting portion is affixed to said frame at an aft mounting point forward of said rear bumper, said rear bumper located between said actuator mount portion and said aft mounting point;
    a vertical actuator having a fixed portion and a moving portion, said fixed portion is affixed to said actuator mount portion, said moving portion telescopically movable between a raised and a lowered position;
    a platform pivotably affixed to a terminal end of said moving portion, said platform pivotable between a stowed and a use position;
    said vehicle having signal lights affixed to said body and spaced horizontally from each other by a first distance, said platform having a width greater than said first distance, when said platform is in said stowed position, said signal lights are obscured; and
    orthogonal brake lights affixed to said platform, said orthogonal brake lights facing a first direction and a second direction perpendicular to said first direction.

9. The compact vehicle of claim 8, further comprising a limit switch in electrical communication with said propulsion system, when said moving portion is away from said raised position, said limit switch disables said propulsion system.

10. The compact vehicle of claim 9, further comprising an indicator in electrical communication with said limit switch, said indicator providing a status of said limit switch and said propulsion system.

11. The compact vehicle of claim 8, wherein said vehicle having a track width defining a second distance, said platform width is greater than said second distance.

12. The compact vehicle of claim 8, wherein said platform is securable in said stowed position by a latch, said latch having a release handle coupled to a lock pin and is biased towards a locked position, said locked position defined by said lock pin extending outwardly, when said platform is in said stowed position, said lock pin mates with a locking feature in said locked position, said release handle for moving said lock pin to an unlocked position defined by said locking feature free of said lock pin.

13. A compact vehicle for use with a mobility scooter:
said compact vehicle having a frame, a body, and a propulsion system connected to a battery;
a subframe having a lower mounting portion and an upper mounting portion, said lower mounting portion is affixed to said frame adjacent said rear bumper on said vehicle, said upper mounting portion is affixed to said frame over a rear axle, said subframe having an actuator mount portion extending beyond said rear bumper on said compact vehicle, said actuator mount portion has an upper plate and a lower plate spaced from and parallel to said upper plate, said upper and lower plates each having a central aperture to receive said fixed portion of a vertical actuator;
said vertical actuator having a fixed portion and a moving portion, said fixed portion is affixed to said actuator mount portion, said moving portion telescopically movable between a raised and a lowered position; and
a platform pivotably affixed to a terminal end of said moving portion, said platform pivotable between a stowed and a use position.

14. The compact vehicle of claim 13, wherein said lower mounting portion is affixed to said frame at an aft mounting point forward of said rear bumper, said rear bumper located between said actuator mount portion and said aft mounting point.

15. The compact vehicle of claim 13, further comprising a limit switch in electrical communication with said propulsion system, when said moving portion is away from said raised position, said limit switch disables said propulsion system.

16. The compact vehicle of claim 13, wherein said vehicle having signal lights affixed to said body and spaced horizontally from each other by a first distance, said platform having a width greater than said first distance, when said platform is in said stowed position, said signal lights are obscured.

17. The compact vehicle of claim 13, further comprising orthogonal brake lights affixed to a distal lateral edge of said platform, said orthogonal brake lights facing a first direction and a second direction perpendicular to said first direction.

18. The compact vehicle of claim 13, wherein said vehicle having a track width defining a second distance, said platform having a width greater than said second distance.

19. The compact vehicle of claim 13, wherein said platform is securable in said stowed position by a latch, said latch having a release handle coupled to a lock pin and is biased towards a locked position, said locked position defined by said lock pin extending outwardly, when said platform is in said stowed position, said lock pin mates with a locking feature in said locked position, said release handle for moving said lock pin to an unlocked position defined by said locking feature free of said lock pin.

* * * * *